(12) United States Patent
Blümel (10) Patent No.: US 6,940,660 B2
(45) Date of Patent: Sep. 6, 2005

(54) OPTICAL DEVICE (75) Inventor: Simon Blümel, Schierling (DE)

(73) Assignee: Osram GmbH, Munich (DE)

( * ) Notice: Subject to any disclaimer, the term of this patent is extended or adjusted under 35 U.S.C. 154(b) by 0 days.

(21) Appl. No.: 10/417,591

(22) Filed: Apr. 17, 2003

(65) Prior Publication Data
US 2003/0202241 A1 Oct. 30, 2003

Related U.S. Application Data (63) Continuation of application No. PCT/DE01/03677, filed on Sep. 24, 2001.

(30) Foreign Application Priority Data

Oct. 17, 2000 (DE) ........................ 100 51 464

(51) Int. Cl.⁷ .............................................. G02B 17/00
(52) U.S. Cl. ...................... 359/726; 359/727; 359/728; 359/729
(58) Field of Search ............................... 359/726–729, 359/708; 385/146; 362/263, 522

(56) References Cited

U.S. PATENT DOCUMENTS

| | | | | |
|---|---|---|---|---|
| 3,718,078 A | | 2/1973 | Plummer ..................... | 359/459 |
| 4,186,433 A | * | 1/1980 | Baldwin ..................... | 362/263 |
| 4,428,673 A | | 1/1984 | Yoshida ..................... | 359/599 |
| 4,753,520 A | | 6/1988 | Silverglate .................. | 359/365 |
| 4,767,172 A | * | 8/1988 | Nichols et al. ............. | 385/146 |
| 4,826,292 A | | 5/1989 | Spohr et al. ................ | 359/707 |
| 4,930,051 A | * | 5/1990 | Golz .......................... | 362/522 |
| 5,566,023 A | | 10/1996 | Kley .......................... | 359/569 |
| 5,757,557 A | * | 5/1998 | Medvedev et al. ......... | 359/708 |
| 6,252,724 B1 | | 6/2001 | Scheer ....................... | 359/723 |

FOREIGN PATENT DOCUMENTS

| | | |
|---|---|---|
| DE | 1 233 792 | 2/1967 |
| DE | 2 163 925 | 7/1972 |
| DE | 31 18 349 A1 | 6/1982 |
| DE | 33 17 519 A1 | 11/1984 |
| DE | 35 41 327 A1 | 5/1987 |
| DE | 195 07 234 A1 | 9/1996 |
| DE | 198 34 521 A1 | 2/2000 |
| EP | 0 421 824 A1 | 4/1991 |
| EP | 0 798 788 A1 | 10/1997 |
| EP | 0 977 059 A2 | 2/2000 |
| JP | 61 214 485 A | 9/1986 |
| JP | 5-281402 | 10/1993 |
| WO | 87/00297 | 1/1987 |
| WO | 98/33007 | 7/1998 |
| WO | 99/50596 | 10/1999 |
| WO | 00/24062 | 4/2000 |

OTHER PUBLICATIONS

English abstract of previously filed German Published Prosecuted Patent Application DE 1 233 792 (Nagel et al.), dated Feb. 9, 1967.

English abstract of previously filed German Published Non-Prosecuted Patent Application DE 33 17 519 A1 (Dinkelacker), dated Nov. 15, 1984.

* cited by examiner

Primary Examiner—Georgia Epps
Assistant Examiner—Jack Dinh
(74) Attorney, Agent, or Firm—Laurence A. Greenberg; Werner H. Stemer; Ralph E. Locher (57) ABSTRACT

An optical device has a plurality of optical elements lined up in a row laterally. The optical elements in each case have a light entry surface, a light exit surface, and an associated optical axis. The light entry surfaces are in each case formed convexly in the manner of a lens in a central region surrounding the optical axis. The central region is in each case surrounded by an annular reflector, which is preferably composed of a plurality of individual reflectors.

26 Claims, 7 Drawing Sheets

OPTICAL DEVICE

CROSS-REFERENCE TO RELATED APPLICATION

This application is a continuation of copending International Application No. PCT/DE01/03677, filed Sep. 24, 2001, which designated the United States and was not published in English.

BACKGROUND OF THE INVENTION

Field of the Invention

The invention relates to an optical device having a plurality of optical elements disposed laterally adjacent to one another. Each of the optical elements being assigned an optical axis and has a light entry surface and a light exit surface.

In lighting systems based on light emitting diodes (LEDs), lenses are normally used to collimate the radiation emitted. For efficient illumination in this case, a large entry aperture or a high luminous intensity of the collimating optics is desirable.

A high luminous intensity can generally be achieved by short focal length lenses of large diameter. Disadvantageously, this also entails a large lens thickness, which leads to heavy, large volume illumination systems requiring a great deal of material. In the case of spherical lenses, a further drawback resides in the fact that the projection errors increase with increasing distance from the optical axis. In addition, the reflection losses increase toward the edge of the lens, because of the entry angle becoming flatter.

In the case of lighting systems with a plurality of individual LEDs as a light source, the aforementioned projection errors and shadows in the edge regions of the individual collimating lenses lead to an inhomogeneous luminous flux distribution. In particular, the individual light sources often remain detectable, which is undesirable in the signaling and lighting sectors.

One improvement is achieved by Fresnel stepped lenses, as they are known, as disclosed by International Patent Disclosure WO 87/00297, for example. In the case of these stepped lenses, the lens surface is subdivided in the manner of steps into a large number of annular, concentric zones, so that a flatter configuration that saves material is achieved. Nevertheless, these lenses also exhibit considerable shadows at a relatively large distance from the optical axis. Furthermore, the overall transmission of such lenses is limited by the large number of discontinuities and edges on the lens surface.

SUMMARY OF THE INVENTION

It is accordingly an object of the invention to provide an optical device that overcomes the above-mentioned disadvantages of the prior art devices of this general type.

With the foregoing and other objects in view there is provided, in accordance with the invention, an optical device. The optical device contains a plurality of optical elements disposed laterally adjacent to one another. Each of the optical elements has an optical axis, a central region, an annular reflector surrounding the central region, a light entry surface, and a light exit surface. The light entry surface is formed convexly in a manner of a lens in the central region surrounding the optical axis.

It is an object of the present invention to provide an optical device and a lighting device with a high luminous flux and, on the exit side, the most homogeneous luminous flux distribution possible.

According to the invention, provision is made to form an optical device having a plurality of optical elements disposed laterally adjacent to one another, each optical element being assigned with an optical axis and each optical element having a light entry surface and a light exit surface. The light entry surface is in each case formed convexly in the manner of a lens in a central region surrounding the optical axis. In each case an annular reflector is disposed around the central region.

With the annular reflector, radiation components that are incident outside the central region are directed toward the light exit surface. In this way, the radiation components that are incident on the optical element remote from the optical axis are advantageously also projected with high efficiency.

In the case of an advantageous development of the invention, the annular reflector or ring is formed from a plurality of individual reflectors. By aligning the reflectors individually with the radiation components to be reflected, the projection characteristics of the reflector ring are improved.

The reflection at the reflector ring and the individual reflectors is preferably based on total reflection. The reflectance in this case is virtually 100 percent. Advantageously, no treatment of the reflector surfaces to increase the reflection is necessary, since total reflection can be achieved merely by suitable shaping of the optical elements.

In a preferred development of the invention, the central regions of the optical elements are formed as aspherical lenses. As compared with a spherical lens, this achieves largely distortion-free, virtually optimum projection in the central region.

One advantageous refinement of the invention consists in forming the reflector surfaces, entirely or in some regions, as a surface of a conical segment, a spherical segment, a paraboloidal segment or an ellipsoidal segment.

Given a suitable configuration, the incident radiation component from a radiant source is advantageously approximately transformed by a paraboloidal segment into a parallel beam. The radiation as a parallel beam is desirable in particular in the signal sector, in order to make the signal visible over great distances.

As a result of the formation as an ellipsoidal segment, specific focusing of the projected light beam is also possible. This can be advantageous for specific point-like lighting systems. Furthermore, by slight focusing, an overlap between the lighting systems composed of the individual light sources is achieved, and therefore the homogeneity of the luminous flux distribution of the system is improved overall.

In an extension of the geometric definition, a paraboloid is also to be understood to mean an eccentric paraboloid. The surface of such a body is defined by the rotation of a parabola, the axis of rotation being parallel to and spaced apart from (eccentric) the axis of symmetry of the parabola. By this modification of a rotational paraboloid, virtually perfect projection of a radiant source into a parallel beam is advantageously achieved. The same is true of ellipsoids, so that this is likewise to be understood to mean eccentric ellipsoids.

A paraboloidal or ellipsoidal segment in the case of the invention can also be approximated by a spherical segment or largely by one or more conical segments. The spherical and conical segments advantageously require little expenditure on design and production.

In the case of the optical elements, the lens formed in the central region and the reflector are preferably matched to each other in terms of their shape in such a way that the beam of radiation emitted by a point light source is transformed approximately into a parallel beam. This can be achieved by a confocal configuration of the lens and the reflector. Moreover, in the case of a reflector composed of a plurality of subregions, a confocal configuration of the subregions is advantageous.

A further advantage of the invention consists in the fact that the projection characteristics described hitherto are affected merely by shaping the surface on the light entry side. In particular, the beam of radiation from a point light source, such as is formed approximately for example by a luminescent diode such as an LED or, specifically, an LED chip, can be converted on the entry side into a parallel beam. Therefore, the divergent beam of radiation from the point light source is converted into a parallel beam because of the refraction at the light entry surface and the reflection at the reflectors of the optical element. Thus, the beam of radiation is already incident as a parallel beam on the light exit surface. As a result of making the beam of radiation parallel on the entry side, a particularly homogeneous radiation distribution on the light exit side is achieved.

Advantageously, refraction or another optical projection at the light exit surface is not required in order to make the beam of radiation parallel. This makes a planar light exit surface possible and facilitates the construction of large-area optical devices by lining up a plurality of preferably identical optical elements in a row.

In an advantageous refinement of the invention, the surface on the light exit side is unstructured and flat. Such a surface is largely resistant to contamination and can likewise be cleaned easily. This is of particular advantage in outdoor lighting systems. Alternatively, the light exit surface can be spherically or aspherically convex, in the manner of a lens.

A preferred refinement of the invention consists in using the surface on the light exit side for additional functions. This surface is preferably provided with a grooved, knob or point structure, which effects one-dimensional or all-round deflection or scattering of the radiation and is advantageous in particular in flat lighting systems. The structuring can be distributed statistically or disposed regularly. A statistical distribution effects a particularly homogeneous luminous flux distribution, but regular structuring can likewise be produced more easily.

Roughening of the surface on the light exit side is further preferred. The roughening acts as a diffuser and leads to additional homogenization of the luminous flux distribution.

Such structuring or roughening can be disposed on its own or in combination, also in the form of patterns or symbols, on the surface on the light exit side, in order to achieve pictorial lighting effects.

The optical elements are preferably formed as rotational bodies, in particular with respect to the reflector surfaces and the central region curved in the manner of a lens. This shaping corresponds to the rotationally symmetrical radiation characteristics of a point light source, for example an LED chip, so that the entire radiation lobe can therefore be projected in the same way. In order to line them up in a row, these rotationally symmetrical optical elements can be connected by webs or by a common carrier plate.

The side surfaces of the rotational body can be provided with flats or flattened areas, which permit a plurality of optical elements to be lined up in a row without additional connecting elements. This makes it easier, in particular, to configure larger-area devices. The flats or flattened areas preferably are located at points that do not critically impair the projection characteristics.

A plastic that is transparent to radiation is preferably used as material for the optical device. For example, reactive resins are suitable, and can possibly also be colored. Particularly preferred in this case are polycarbonate (PC) or acrylates such as polymethyl methacrylate (PMMA). These materials can be processed by the injection molding method, which provides a simple and cost-effective possible way of producing the optical element. Glass can also be used as a material for the optical devices.

In a preferred development of the invention, one or more luminescent diodes are positioned in the focal range of an optical element, so that the luminescent diodes and the optical device form a lighting configuration.

The designation luminescent diode in this case contains light emitting diodes, LEDs in the form of LED chips and LED components and laser diodes. An LED component has in particular one or more LED chips that are mounted on a carrier or in a housing. In the invention, use is preferably made of surface-mountable luminescent diodes, which are particularly preferably mounted on a common carrier plate, for example a circuit board.

Moreover, a plurality of optical elements can be joined together, lined up laterally in a row, to form larger, for example matrix-like, lighting systems. The lighting configurations formed in this way are distinguished by high efficiency, a longer lifetime and greater reliability.

Other features which are considered as characteristic for the invention are set forth in the appended claims.

Although the invention is illustrated and described herein as embodied in an optical device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1A:
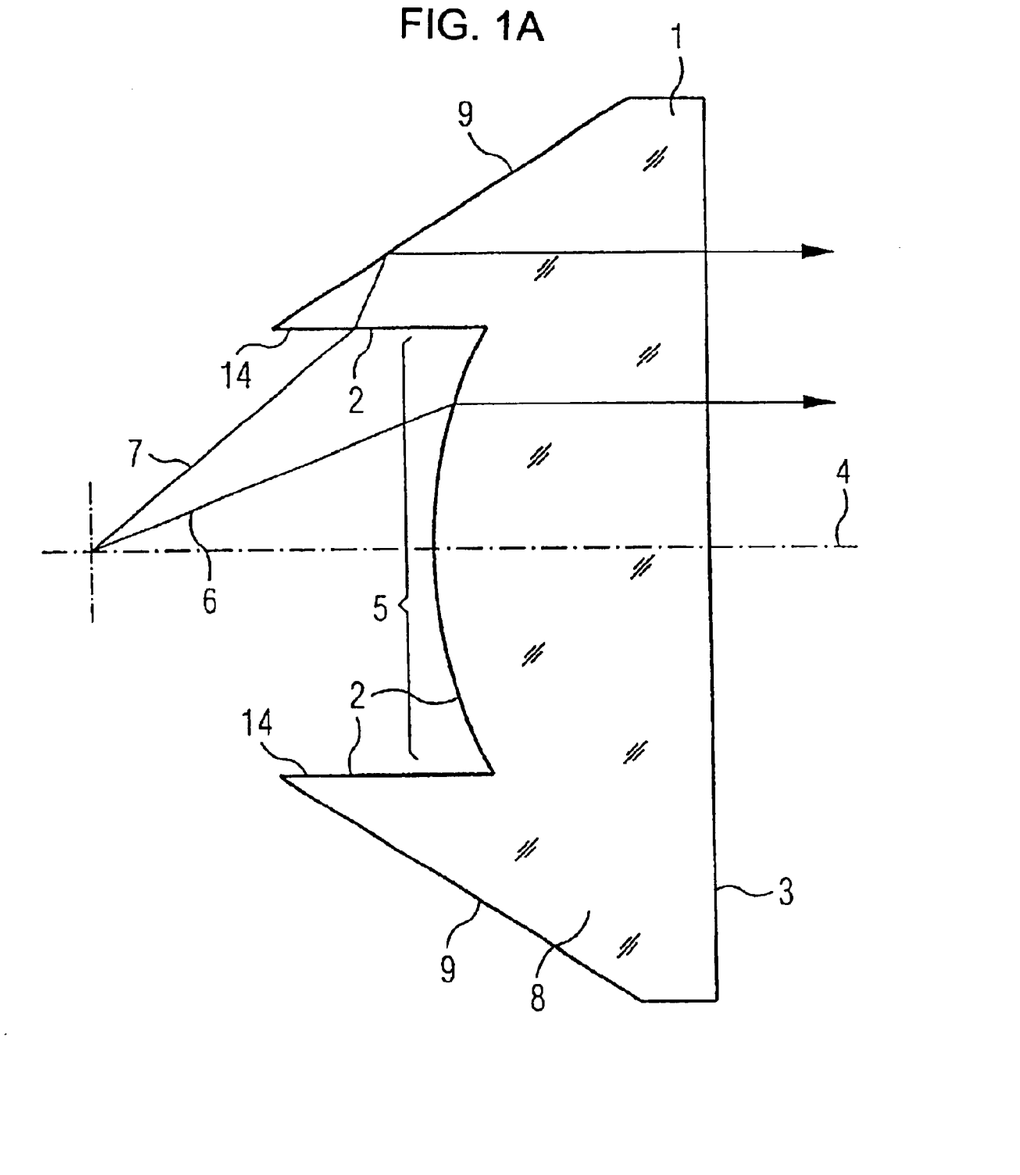
FIG. 1A is a diagrammatic, sectional view of a first exemplary embodiment of an optical element according to the invention.

In all the figures of the drawing, sub-features and integral parts that correspond to one another bear the same reference symbol in each case. Referring now to the figures of the drawing in detail and first, particularly, to FIG. 1 thereof, there is shown an exemplary embodiment of an optical element, whose basic body 1 has a light entry surface 2 subdivided into a central region 5 and an edge region 14, and a planar light exit surface 3. An optical axis 4 runs centrally through the basic body 1 and the central region 5. In the central region the surface is shaped spherically or preferably aspherically in the manner of a conventional lens. The components of radiation 6 that are incident in the central region 5 are projected by refraction at the curved surface.

The central region 5 is surrounded by a reflector ring 8 shaped like a saw tooth in section. The radiation 7 that is incident here is refracted at an inner flank 14 of the reflector ring 8 and is totally reflected at an outer surface 9 of the basic body 1. The outer surface 9 being a reflector surface 9 is disposed in such a way that the incident radiation is projected in substantially the same way as the radiation in the central or inner region 5.

Figure 1B:
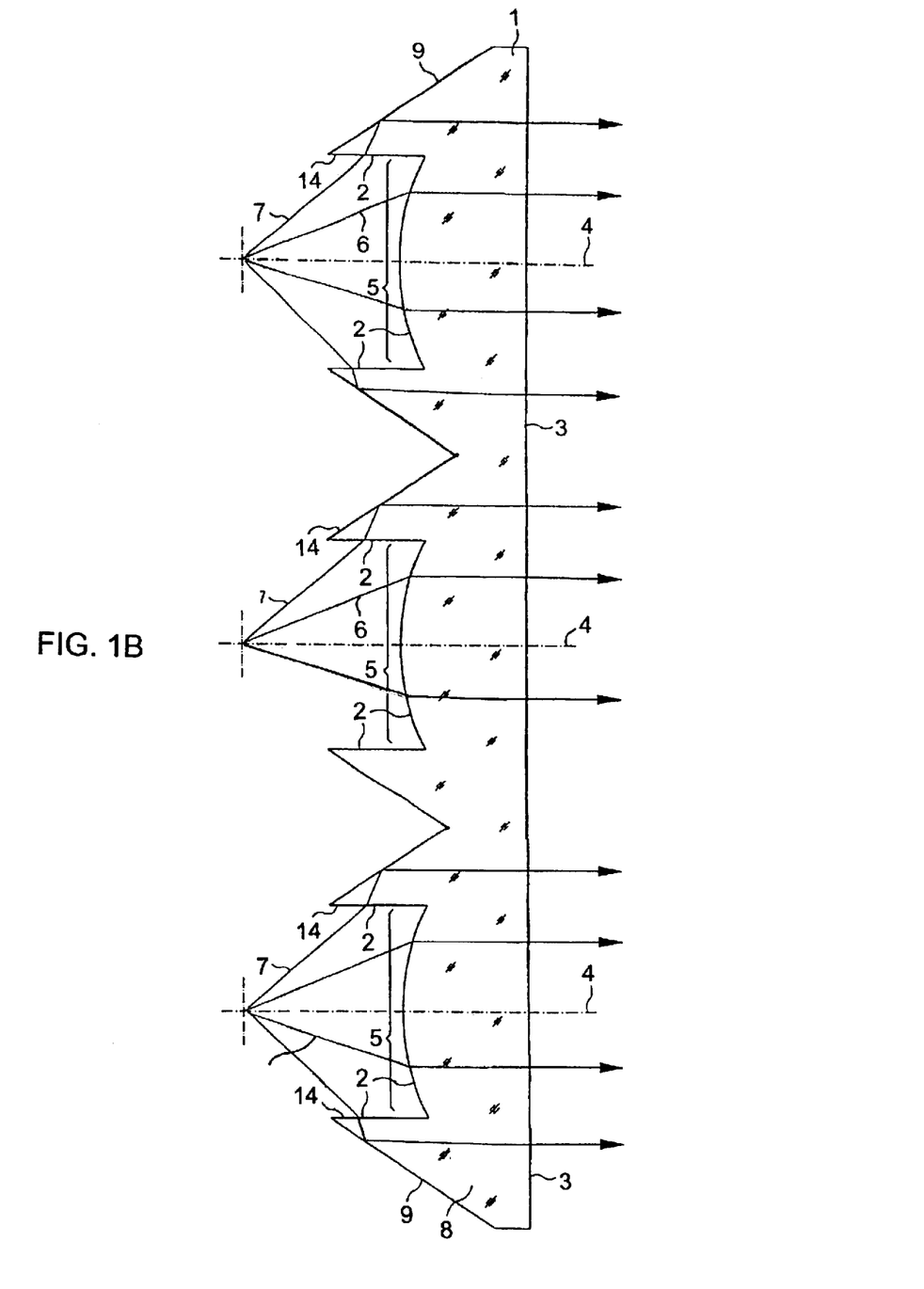
FIG. 1B is a diagrammatic, sectional view of a first exemplary embodiment of an optical device according to the invention.

The exemplary embodiment of an optical device illustrated in FIG. 1B is formed by lining up three optical elements according to FIG. 1A laterally, the light exit surfaces 3 of the optical elements being disposed in a common plane. Accordingly, the optical axes 4 are aligned parallel with one another.

Of course, an optical device according to the invention can also be formed with a different number of optical elements.

In order to form a large area optical device, a corresponding two-dimensional configuration in the form of a matrix of optical elements is expedient.

Figure 2A:
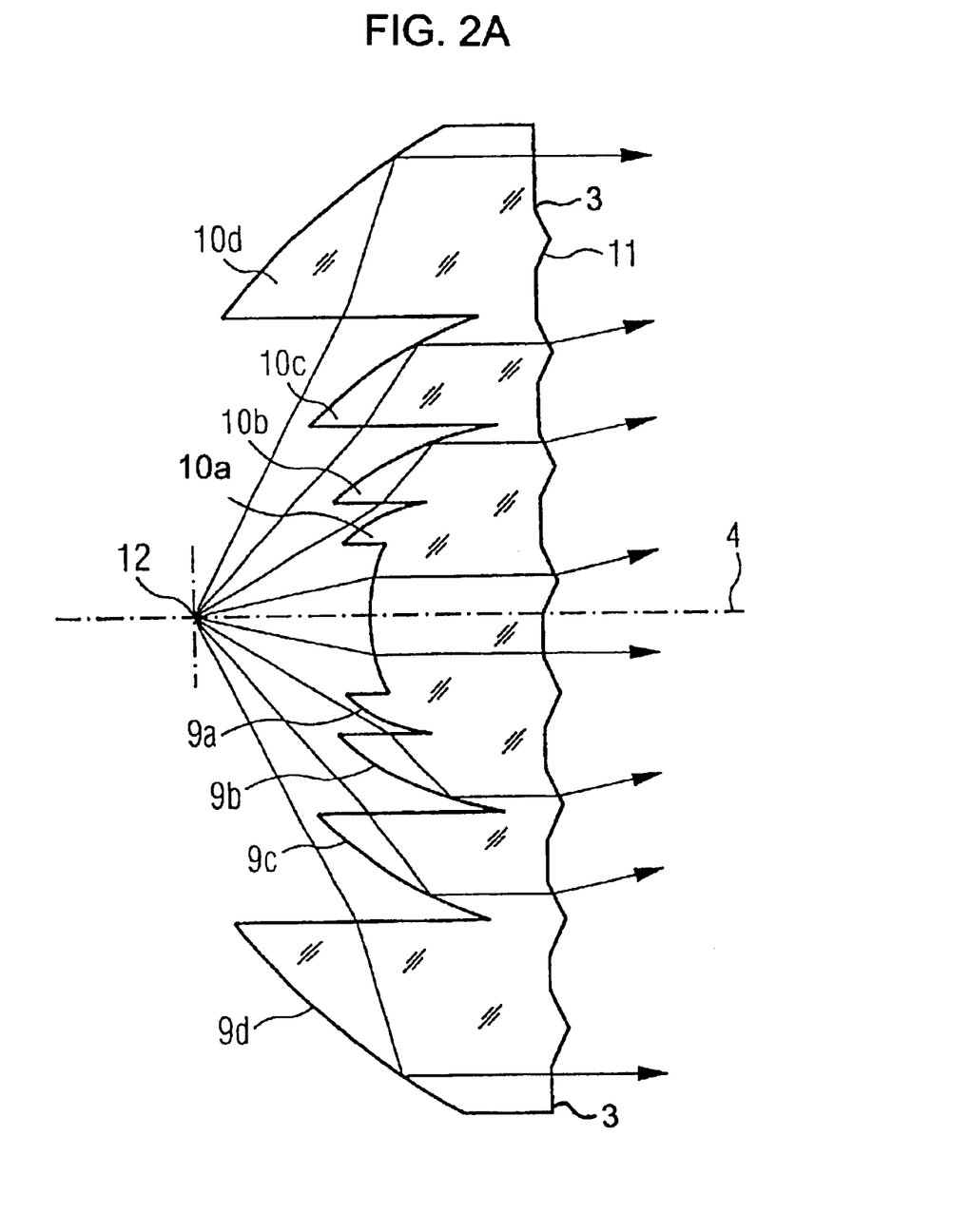
FIG. 2A is a diagrammatic, sectional view of a second exemplary embodiment of the optical element according to the invention.

The exemplary embodiment of the optical element illustrated in FIG. 2A differs from the exemplary embodiment shown in FIG. 1A in that the optical element has a plurality of annular individual reflectors 10a to 10d, which are disposed concentrically. The individual reflectors designated 10a to 10d are formed as total reflectors, as in the previous example, the associated totally reflective surfaces 9a to 9d in FIG. 2A in each case being configured as surface segments of a rotational paraboloid. Therefore, the radiation from a point radiant source, such as an LED chip, is transformed approximately into a parallel beam.

Furthermore, on the surfaces 3 on the light exit side, a knob structure 11 in the form of flat pyramids is formed, which effects irregular scattering of the parallel beam and thus a uniform luminous flux distribution. Alternatively, the surface 3 on the light exit side, depending on the field of application of the optical element, can also be unstructured, flat or curved.

Figure 2B:
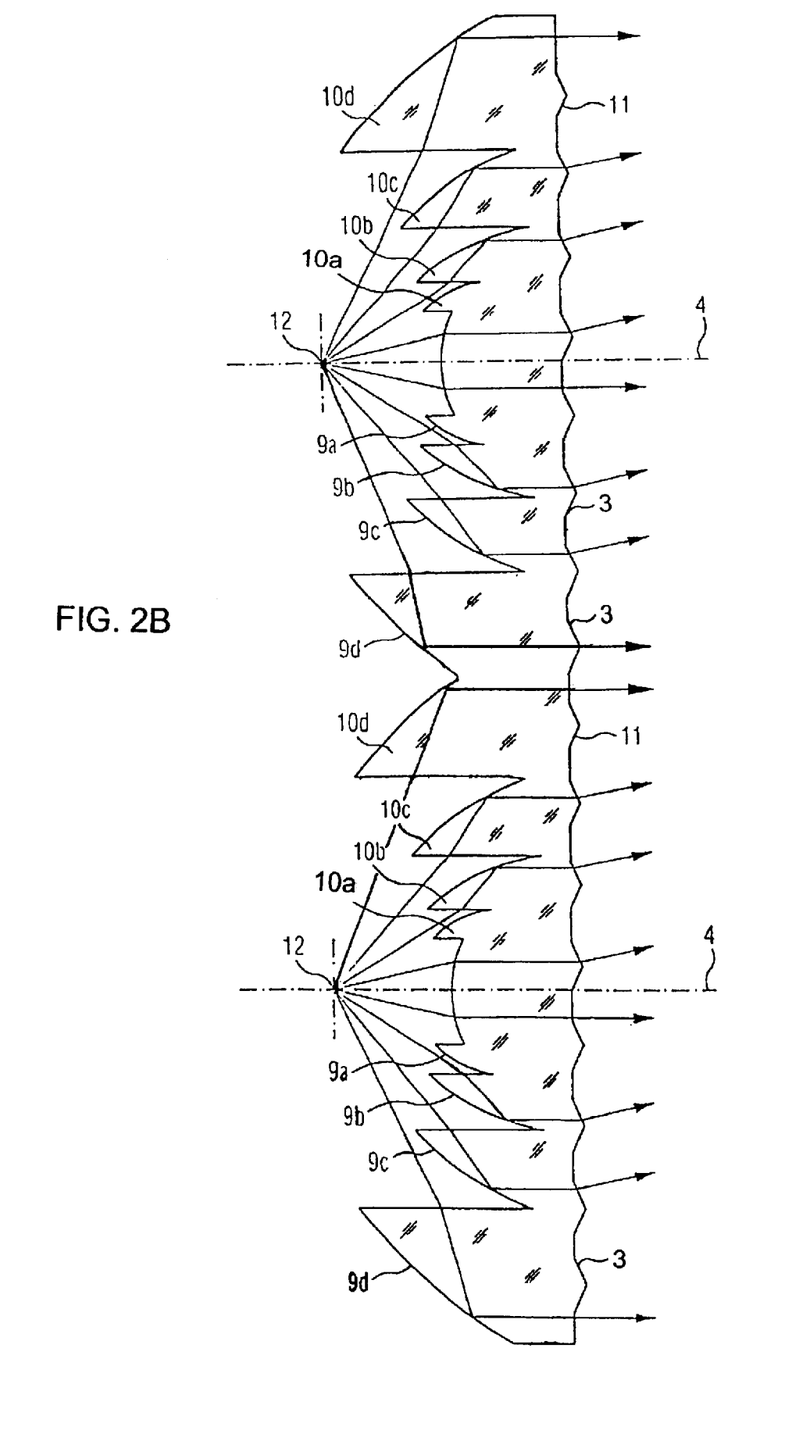
FIG. 2B is a diagrammatic, sectional view of a second exemplary embodiment of the optical device according to the invention.

The second exemplary embodiment of the optical device illustrated in FIG. 2B is again formed by lining up optical elements according to FIG. 2A laterally, the light exit surfaces 3 of the optical elements being disposed in a common plane or the optical axes 4 being aligned parallel with one another.

Figure 3:
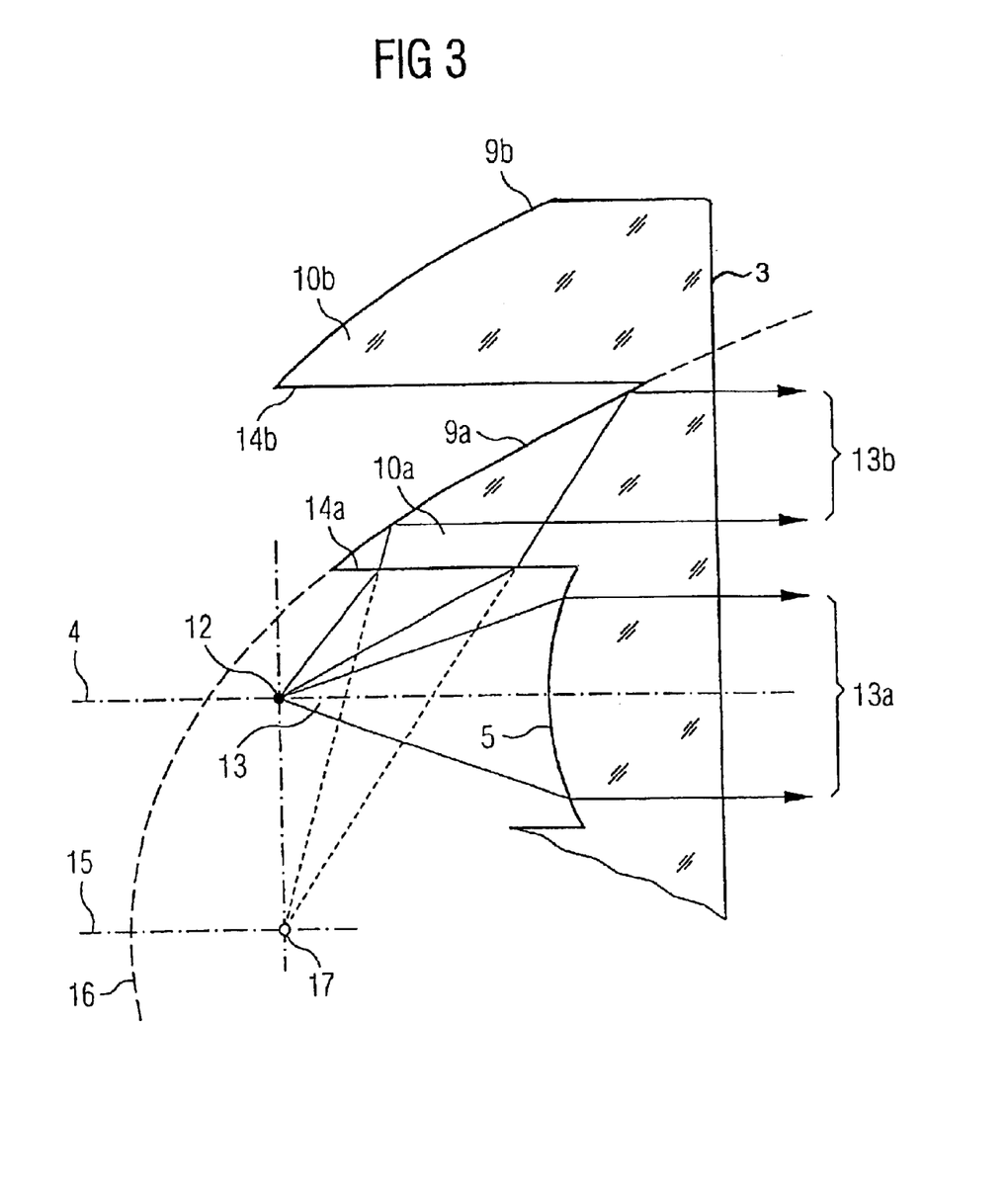
FIG. 3 is a partial, diagrammatic, sectional view of a third exemplary embodiment of the optical element for the optical device according to the invention.

In the exemplary embodiment of an optical element illustrated in FIG. 3, the reflector surface 9 of the optical element is composed of the surface segments 9a, 9b of eccentric rotational paraboloids. The part surfaces are coordinated with one another in such a way that the incident components of a beam from a point light source are transformed into parts of a parallel beam. The dimensioning of the optical element is given by the now described relationship.

A beam of radiation 13 emitted by a point light source 12, for example an LED chip, breaks down into a main beam 13a and a plurality of secondary beams, of which only one 13b is illustrated for clarity. The light source 12 is disposed at a focus of the lens formed in the central region 5, so that the main radiation beam 13a is projected in a parallel beam.

The secondary beam 13b is first refracted at the inner surface 14a of the first reflector ring 10a. As a result, on the side of the object there is produced a virtual light source 17, whose position is given by the laws of refraction. The part reflector surface 9a of the first reflector ring 10a is formed as a surface segment of an eccentric paraboloid. The surface of the paraboloid is defined by the rotation of a parabola 16, whose axis of symmetry 15 is parallel with the optical axis 4 and whose focus coincides with the virtual light source 17. In this case, the eccentric axis of rotation is given by the optical axis 4. The size of the individual reflector rings 10a, 10b can be defined by the curvature of the parabola 16. The dimensioning of the reflector ring 10b located further out is carried out on the same principle. Likewise, further individual reflector rings can be added. Lining them up in a row to form a non-illustrated optical device can be carried out in a manner analogous to FIGS. 1B and 2B. Likewise, a matrix-like two-dimensional configuration is again possible.

In order to simplify the configuration and production, the paraboloid segment or segments can also be approximated by appropriate spherical or conical segments. For focusing optics, instead of eccentric paraboloid segments, corresponding ellipsoidal segments have to be used as part reflector surfaces, the virtual light source 17 being disposed at one of the two foci of the respective ellipsoid. Additionally or alternatively, focusing can also be achieved by a curvature of the light exit surface.

Figure 4A:
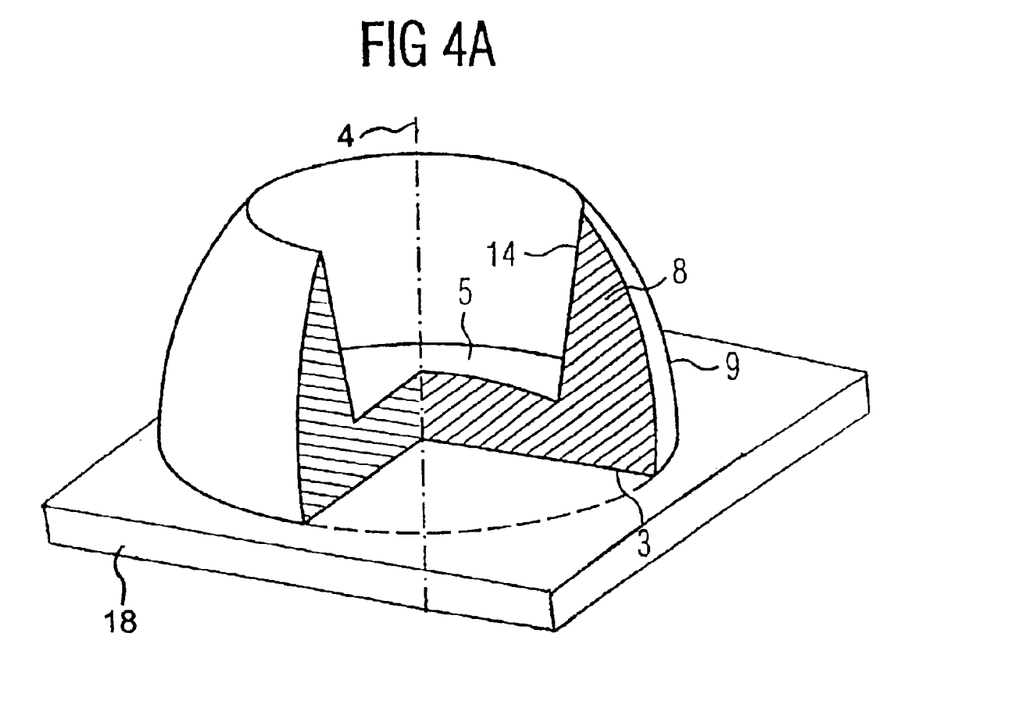
FIG. 4A is a perspective and part sectional view of a fourth exemplary embodiment of the optical element according to the invention.

In FIG. 4A, an exemplary embodiment of the optical element whose cross-section corresponds to the first exemplary embodiment is illustrated perspectively, but the reflector surface 9 being rotationally symmetrical and in particular parabolically curved. The optical element shown is formed as a rotational body and produced by the injection molding method, for example from PC or PMMA. An injection molding method is suitable in particular since the exemplary embodiment shown has no undercuts. In order to make it easier to remove the cores during production by the injection molding method, the inner flank 14 is formed slightly obliquely with respect to the optical axis 4. The resulting slight changes in the projection characteristics are compensated for by appropriate shaping of the reflector surface 9.

If such optical elements or devices are used outdoors, then UV-stabilized polycarbonate is particularly suitable as material.

Figure 4B:
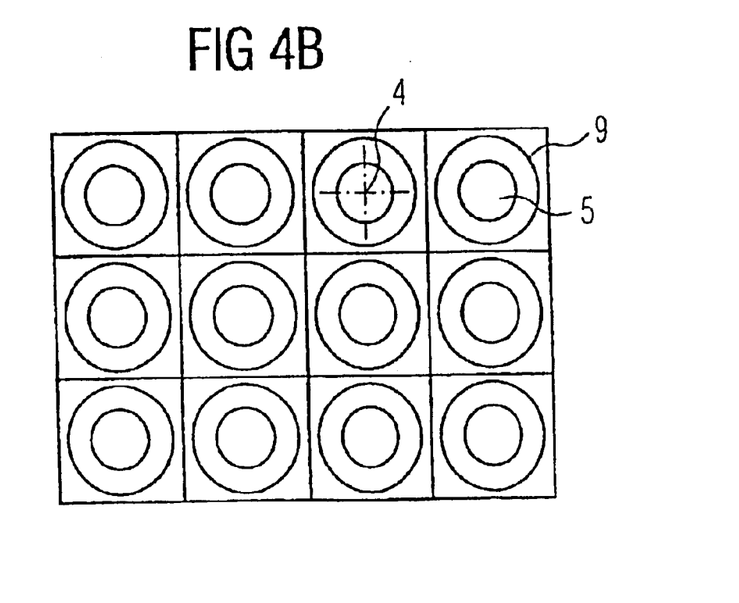
FIG. 4B is a schematic view of a fourth exemplary embodiment of the optical device according to the invention.

The optical elements can, for example, be lined up in a row by a carrier plate 18 to form an optical device containing a plurality of such optical elements. A corresponding optical device is illustrated in the plan view in FIG. 4B.

Figure 4C:
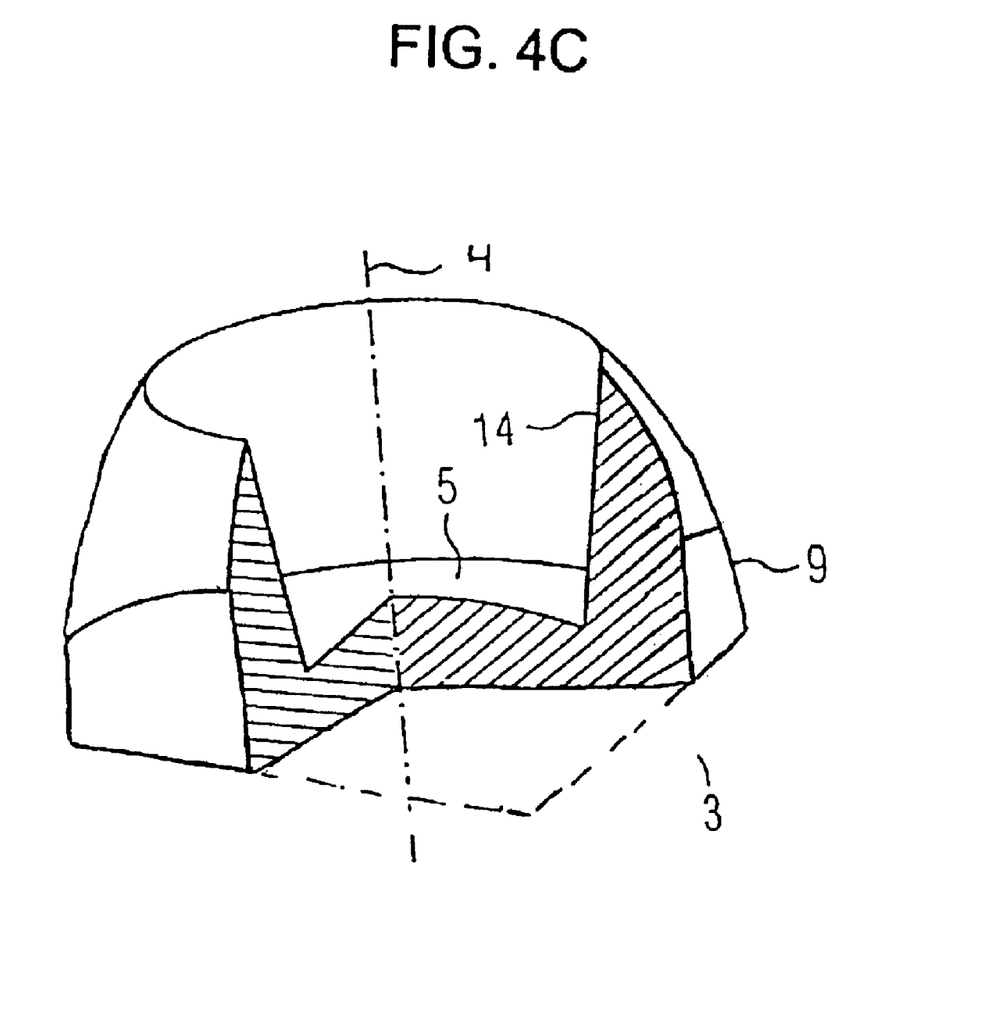
FIG. 4C is a perspective and part sectional view of a fifth exemplary embodiment of the optical element for the optical device according to the invention.

In the exemplary embodiment shown in FIG. 4A, the side surfaces are preferably flattened at points not contributing to the projection, so that optical elements are produced which can be combined in the manner of a matrix or grid and, filling the area, form an optical device, FIG. 4C. The plan view of such an optical device in turn substantially corresponds to FIG. 4B.

The optical devices are shown in the figures can be formed from optical elements by being joined together, for example adhesively bonded. The optical devices are preferably produced in one piece, for example by the injection molding method.

Furthermore, a plurality of optical devices can also be combined to form optical modules. In order to form a lighting system, luminescent diodes such as LED components or LED chips are disposed on the light entry side, in each case at least one luminescent diode preferably being assigned to an optical element. The luminescent diodes can preferably be surface mounted and, in addition, mounted on a common carrier in the form of a circuit board or another electrical connecting board.

In this case, it is expedient to dispose the luminescent diodes in the focal plane of the optical device, in particular at the point of intersection of the optical axis of the associated optical element and the focal plane.

A modular lighting system of this type is distinguished by particularly high flexibility. Furthermore, the possibility is also provided of combining a plurality of such individual modules three-dimensionally to form lighting elements. In every case, lining up in a row can be carried out by adhesive connections or plug-in connections, which are preferably likewise formed by the injection molding method.

Of course, the explanation of the invention using the exemplary embodiments shown is not to be understood as restricting the invention to this. Moreover, the optical elements and in particular their shaping already constitute an invention on their own.

I claim:

1. An optical device, comprising:
a plurality of optical elements disposed laterally adjacent to one another, each of said optical elements having an optical axis, a central region, a plurality of confocally disposed annular reflector surrounding said central region, a light entry surface, and a light exit surface, said light entry surface formed convexly in a manner of lens in said central region surrounding said optical axis.

2. The optical device according to claim 1, wherein each of said annular reflectors has a reflector surface that is totally reflective, at least in a subregion.

3. The optical device according to claim 1, wherein at least for some of said optical elements, said central region is formed as an aspherical lens.

4. The optical device according to claim 1, wherein each of said annular reflector has a reflector surface which, at least in some regions, is shaped as a surface of a conical segment.

5. The optical device according to claim 1, wherein each of said annular reflector has a reflector surface which, at least in some regions, is shaped as a surface of a paraboloid segment.

6. The optical device according to claim 1, wherein each of said annular reflector has a reflector surface which, at least in some regions, is shaped as a surface of an ellipsoidal segment.

7. The optical device according to claim 1, wherein said optical axis of each of said optical elements are parallel to one another.

8. The optical device according to claim 1, wherein said optical elements all have an equivalent shape.

9. The optical device according to claim 1, wherein said annular reflectors of said optical elements are matched to each other such that a beam of rays from a point light source is projected approximately in a parallel beam.

10. The optical device according to claim 9, wherein said annular reflector converts the beam of rays from the point light source into the parallel beam on an entry side.

11. The optical device according to claim 1, wherein said light exit surface of some of said optical elements has a flat shape.

12. The optical device according to claim 1, wherein said light exit surface of at least some of said optical elements is one of convex shaped and curved shaped.

13. The optical device according to claim 12, wherein said light exit surface has structures for one of scattering and deflecting an emergent beam of rays.

14. The optical device according to claim 1, wherein said light exit surface has, at least in parts, a grooved structure.

15. The optical device according to claim 1, wherein said light exit surface has, at least to some extent, one of a knob structure and a point structure.

16. The optical device according to claim 1, wherein said light exit surface is at least partly roughened.

17. The optical device according to claim 1, wherein said optical elements have, at least to some extent, a rotationally symmetrical basic shape.

18. The optical device according to claim 17, wherein said rotationally symmetrical basic shape has a circumference and said circumference having a flatten surface in parts.

19. The optical device according to claim 18, wherein said flattened surface permits said optical elements to be lined up in a row laterally, next to each other in an almost gap free manner.

20. The optical device according to claim 1, wherein said optical elements are formed of a plastic that is transparent to radiation.

21. The optical device according to claim 20, wherein said optical elements are formed from a reactive resin selected from the group consisting of an acrylic resin and a polycarbonate.

22. An illumination configuration, comprising:
a plurality of optical elements disposed laterally adjacent one another, each of said optical elements having an optical axis, a central region, a plurality of confocally disposed annular reflectors surrounding said central region, a light entry surface, and a light exit surface, said light entry surface formed convexly in a manner of a lens in said central region surrounding said optical axis; and
a luminescent diode chip disposed on a side of said light entry surface.

23. The illumination configuration according to claim 22, wherein said luminescent diode is disposed in a focal range of one of said optical elements.

24. The illumination configuration according to claim 22, wherein said luminescent diode is one of plurality of luminescent diodes, which are associated with said optical elements, and are disposed on said side of said light entry surface.

25. The illumination configuration according to claim 24, wherein said luminescent diodes are disposed in a focal range of a respectively associated one of said optical elements.

26. An optical device, comprising:
a plurality of optical elements disposed laterally adjacent one another, each of said optical elements having an optical axis, a central region, a plurality of confocally disposed annular reflectors surrounding said central region, a light entry surface, and a light exit surface, said light entry surface formed convexly in a manner of a lens in said central region surrounding said optical axis, each of said annular reflectors having a reflector surface being totally reflective, at least in a subregion.

* * * * *

UNITED STATES PATENT AND TRADEMARK OFFICE
CERTIFICATE OF CORRECTION

PATENT NO. : 6,940,660 B2
DATED : September 6, 2005
INVENTOR(S) : Simon Blümel It is certified that error appears in the above-identified patent and that said Letters Patent is hereby corrected as shown below:

Column 7,
Line 36, should read:
-- one another, each of said optical elements having an --.
Line 38, should read:
-- disposed annular reflectors surrounding said central --.
Lines 49, 53 and 57, should read:
-- of said annular reflectors has a reflector surface which, at --.
Line 70, should read:
-- annular reflectors convert the beam of rays from the point --.

Signed and Sealed this

Seventh Day of February, 2006

JON W. DUDAS
*Director of the United States Patent and Trademark Office*